US012046388B2

(12) United States Patent
Duffy

(10) Patent No.: US 12,046,388 B2
(45) Date of Patent: Jul. 23, 2024

(54) RADIO FREQUENCY QUADRUPOLE STARK DECELERATORS AND METHODS OF MAKING AND USING THE SAME

(71) Applicant: University of North Carolina at Greensboro, Greensboro, NC (US)

(72) Inventor: Liam Duffy, Greensboro, NC (US)

(73) Assignee: University of North Carolina at Greensboro, Greensboro, NC (US)

( * ) Notice: Subject to any disclaimer, the term of this patent is extended or adjusted under 35 U.S.C. 154(b) by 367 days.

(21) Appl. No.: 17/668,947

(22) Filed: Feb. 10, 2022

(65) Prior Publication Data

US 2022/0165449 A1 May 26, 2022

Related U.S. Application Data

(63) Continuation of application No. PCT/US2020/049355, filed on Sep. 4, 2020.

(60) Provisional application No. 62/895,533, filed on Sep. 4, 2019.

(51) Int. Cl.
*G21K 1/087* (2006.01)

(52) U.S. Cl.
CPC .................................... *G21K 1/087* (2013.01)

(58) Field of Classification Search
CPC ................................ G21K 1/087; H05H 9/045
See application file for complete search history.

(56) References Cited

U.S. PATENT DOCUMENTS 4,001,102 A 1/1977 Batha et al.
4,440,638 A 4/1984 Judy et al.
5,993,632 A 11/1999 Becker et al.
8,953,145 B2 * 2/2015 Kraus ................ G03F 7/70983 355/53

(Continued)

FOREIGN PATENT DOCUMENTS

JP 11-510946 A 9/1999
JP 4578613 B2 11/2010
WO 93/20927 A1 10/1993

OTHER PUBLICATIONS

ISA/KIPO; International Search Report and Written Opinion for International Patent Application No. PCT/US2020/049355 dated Dec. 17, 2020, 11 pages.

(Continued)

*Primary Examiner* — David A Vanore
(74) *Attorney, Agent, or Firm* — NK Patent Law

(57) ABSTRACT

According to one embodiment, an apparatus is disclosed for implementing a radio frequency quadrupole stark decelerator (RFQ-SD). The RFQ-SD includes two dielectric plates having substantially planar shapes. The first dielectric plate includes a first set of wires being attached onto a surface of the first dielectric plate and a second set of wires being attached onto the surface of the first dielectric plate. The second dielectric plate includes a third set of wires being attached onto a surface of the second dielectric plate and a fourth set of wires being attached onto the surface of the second dielectric plate. The first dielectric plate and the second dielectric plate are spaced apart such that every four wires, two wires from the first dielectric plate and two wires from the second dielectric plate, form a quadrupole electric field channel for guiding neutral polar molecules.

16 Claims, 10 Drawing Sheets

(56) References Cited

U.S. PATENT DOCUMENTS

| | | | | |
|---|---|---|---|---|
| 2010/0289491 | A1* | 11/2010 | Budker .................. | G01R 33/26<br>324/304 |
| 2022/0165449 | A1* | 5/2022 | Duffy ..................... | G21K 1/087 |

OTHER PUBLICATIONS

WIPO; International Preliminary Report on Patentability for International Patent Application No. PCT/US2020/049355 dated Mar. 8, 2022, 8 pages.

ISA/EPO; Supplementary European Search Report for European Patent Application No. EP 20861812.4 dated Sep. 9, 2023, 10 pages.

Gerard Meijer: "Cold Molecules", Chemphyschem, Wiley—V C H Verlag Gmbh & Co. KGAA, DE, vol. 3, No. 6, Jun. 10, 2002 (Jun. 10, 2002), pp. 495-501, XP072199146, ISSN: 1439-4235, DOI: 10.1002/(21002406137)93:- 6<74956: 4:AI1D-C PHC495>3.0.C0;2-R.

* cited by examiner

RADIO FREQUENCY QUADRUPOLE STARK DECELERATORS AND METHODS OF MAKING AND USING THE SAME

PRIORITY CLAIM

This application is a continuation of PCT Patent Application Serial No. PCT/US20/49355 filed Sep. 4, 2020, titled "RADIO FREQUENCY QUADRUPOLE STARK DECELERATORS AND METHODS OF MAKING AND USING THE SAME," which claims priority to U.S. Provisional Patent Application Ser. No. 62/895,533 filed Sep. 4, 2019, titled "RADIO FREQUENCY QUADRUPOLE STARK DECELERATOR," the disclosure of which is incorporated herein by reference in its entirety.

TECHNICAL FIELD

The present invention relates to devices for discriminating molecules, and more specifically, to a miniaturized and planarized radio frequency quadrupole stark decelerators for guiding and decelerating neutral polar molecules by dipole moment.

BACKGROUND

The physics community has had a long-standing effort to create ultra-cold gas molecules for a wide array of applications. Many of these applications require higher phase-space densities than current techniques can achieve. For example, laser cooling techniques used to cool atoms do not work well on molecules. "Brute force" cooling methods such as Stark Decelerators have been attempted as a first cooling stage on the way to next stage cooling using magnetic trapping and subsequent evaporative cooling.

The macroscopic three-dimensional radio frequency quadrupole (RFQ) is a device used to focus, bunch, and accelerate a continuous beam of charged particles. An RFQ consists of a cavity with four electrodes. The four electrodes may be configured in various structures such as four rods, four vanes, split coaxial, double H, etc. In the four-rod structure, for example, four metal cylinders are configured in two pairs, each rod being equidistant from each neighboring rod such that the cross-sectional view forms a square shape.

The Stark decelerator (SD) is a device which accepts a collimated beam of neutral polar molecules entering at one end and slows down a fraction of the molecules as they pass through a sequence of multiple high voltage electrodes. The Stark effect is observed as the shifting and splitting of spectral lines of atoms and molecules due to the presence of an external electric field. For example, an electric field pointing from left to right tends to pull nuclei to the right and electrons to the left. Thus, if a molecule in this field has its electron density oriented disproportionately to the left, its energy is lowered, while if it has the electron density oriented disproportionately to the right, its energy is raised.

Some polar molecules exist in rotational state orientations whose potential energy increases with electric field strength—these are known as 'low field seekers' because they will experience a force away from a high-field region of space as a consequence of the increasing potential energy. In other words, they behave like a ball moving up a hill. Likewise, molecules whose energy decreases with field are known as 'high field seekers' because they will tend to move towards the high field region where their energy is lower.

When a polar molecule in a low field seeking state approaches the high field region between a set of electrodes in a Stark decelerator, it will slow down a little as it experiences an increasing Stark potential. After the molecule reaches a position towards the top of the energy hill, the fields are switched to prevent the molecule from accelerating (running down the other side of the hill). By swapping the voltages of the first set and second set of electrodes, the molecule instantaneously finds itself at the bottom of another hill and continues climbing, slowing down a little more. By repeating this sequence multiple times over with a carefully timed field it is possible to slow a subset of the molecules down. By the same arguments above, a high field seeking molecules may be decelerated in the same fashion, in this case being drawn to, or repelled from, regions of high or low electric field strength, respectively. Notably, the ground (lowest energy) state of all molecules is high field seeking and as such decelerators designed for high field seeking states will have the broadest utility.

Currently, RFQs and SDs are separate devices, one accelerating ions and the other decelerating neutral polar molecules, respectively. The former is used in high energy particle physics experiments while the latter is used for cold chemical physics experiments. RFQs and SDs are both typically relatively large and configured in three-dimensions, as described above. While RFQs inherently work for ions of a given mass to charges ratio, SDs work on neutral polar molecules and hence can discriminate based on mass to dipole moment ratio. To date, SDs have not had the requisite phase space densities necessary for next level magnetic trapping and evaporative cooling.

Mass spectrometers are devices used primarily by the chemical community to determine the identity of molecular species by ionizing them and then separating them by their mass to charge ratios. While parts of a mass spectrometer may accelerate or decelerate ions, separating, discriminating, and identifying ions by mass to charge ratio is the ultimate purpose of the instrument. In general, molecules with the same molecular formula will have the same mass and hence mass to charge ratio. To distinguish these isomers requires careful analysis of fragmentation patterns or add-on techniques such as ion mobility mass spec (IMMS) where differently shaped molecules will experience different amounts of drag when drawn through a buffer gas cell via electric fields. Like a chromatograph, the different isomers may then be separated in time. The resolving power of the IMMS relies on changes to the effective collision cross sectional area of the isomers which is a small effect. In general, different isomer structures lead to much larger effects on the net dipole moment of the molecule. Current mass spec techniques do not use dipole moments to separate, distinguish or identify isomers.

As a result, drawbacks to current technologies for analyzing molecules include: (1) an inability to discriminate molecules by mass-to-dipole moment ratio ($m/\mu$) (2) an inability to work on neutral polar molecules (3) an inability to work on conventional polar molecules in their ground state (4) an inability to distinguish or identify isomers (5) an inability to measure molecular dipole moments (6) an inability to create sufficiently high phase-space density slow-moving molecular beams suitable for use as an initial cooling stage for magnetic trapping and further cooling of neutral polar gas such that they may be used, for example, as quantum bits (qubits) in a quantum computer.

Accordingly, a need exists for a miniaturized device for separating, guiding, and decelerating neutral polar gas molecules by dipole moment in their ground state.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are devices and methods for miniaturized radio frequency quadrupole/hexapole/octupole stark decelerators for separating, guiding, and decelerating neutral polar gas molecules by dipole moment. According to one embodiment, an apparatus is disclosed for implementing a radio frequency quadrupole stark decelerator (RFQ-SD). The RFQ-SD includes two dielectric plates having substantially planar shapes.

The first dielectric plate includes a first set of wires being attached onto a surface of the first dielectric plate and a second set of wires being attached onto the surface of the first dielectric plate. The first set of wires and the second set of wires each include a plurality of electrically conductive wires each being located parallel to one another. The first dielectric plate also includes a first interconnecting wire for connecting one end of each of the first set of wires and a second interconnecting wire for connecting one end of each of the second set of wires. The first set of wires is interdigitated with the second set of wires. The first interconnecting wire and the second interconnecting wire are located on opposite edges of the first dielectric plate.

The second dielectric plate has a substantially planar shape matching the first dielectric plate. The second dielectric plate includes a third set of wires being attached onto a surface of the second dielectric plate and a fourth set of wires being attached onto the surface of the second dielectric plate. The third set of wires and the fourth set of wires include a plurality of electrically conductive wires each being located parallel to one another. The second dielectric plate also includes a third electrically conductive interconnecting wire for connecting one end of each of the third set of wires and a fourth electrically conductive interconnecting wire for connecting one end of each of the fourth set of wires. The third set of wires is interdigitated with the fourth set of wires. The third electrically conductive interconnecting wire and the fourth electrically conductive interconnecting wire are located on opposite edges of the second dielectric plate.

The first dielectric plate and the second dielectric plate are spaced apart such that every four wires, two wires from the first dielectric plate and two wires from the second dielectric plate, form a quadrupole electric field channel for guiding neutral polar molecules.

In some embodiments, at least one of the first set of wires, the second set of wires, the third set of wires, and the fourth set of wires may be substantially sinusoidal in shape. In certain embodiments, the first set of wires, the second set of wires, the third set of wires, and the fourth set of wires may all be substantially sinusoidal in shape In some embodiments, the apparatus may be configured to operate in a plurality of electric field configurations. In a first electric field configuration, a positive voltage may be applied to a first wire of the quadrupole electric field channel, a negative voltage may be applied to a second wire of the quadrupole electric field channel, and substantially no voltage (or DC voltage) may be applied to a third wire and a fourth wire of the quadrupole electric field channel. In a second electric field configuration, a positive voltage may applied to the third wire of the quadrupole electric field channel, a negative voltage may applied to the fourth wire of the quadrupole electric field channel, and substantially no voltage (or DC voltage) may be applied to the first wire and second wire of the quadrupole electric field channel. The quadrupole electric field channel may be switched between the first electric field configuration and the second electric field configuration at a frequency over a period of time. In some embodiments, the frequency may be within a range of 1 kilohertz (kHz) to 10 kHz. In other embodiments, the frequency may be within a range of 10 kHz to 100 kHz. In still other embodiments, the frequency may be within a range of 100 kHz to 1 megahertz (MHz). In still other embodiments, the frequency may be within a range of 1 MHz to 10 MHz. In still other embodiments, the frequency may be within a range of 10 MHz to 100 MHz. In some embodiments, the positive voltage may be between +30 volts and +300 volts, and the negative voltage may be between −30 volts and −300 volts. In other embodiments, the positive voltage may be between +300 volts and +3000 volts, and the negative voltage may be between −300 volts and −3000 volts. In still other embodiments, the positive voltage may be between +3000 volts and +30,000 volts, and the negative voltage may be between −3000 volts and −30,000 volts.

In some embodiments, the apparatus may include a plurality of field channels and each quadrupole electric field channel may be located in substantially a same plane.

In some embodiments, the first set of wires and the second set of wires of the first dielectric plate and the third set of wires and the fourth set of wires of the second dielectric plate may be configured such that an effective sinusoidal wavelength decreases to match shorter distances as polar molecules are decelerated as they traverse the quadrupole electric field channel.

In some embodiments, the apparatus may further include a third dielectric plate positioned between the first dielectric plate and the quadrupole electric field channel. The apparatus may also include a fourth dielectric plate positioned between the second dielectric plate and the quadrupole electric field channel. The third dielectric plate and the fourth dielectric plate may be configured to provide electric field attenuation to the quadrupole electric field channel.

In some embodiments, the first set of wires may be applied to the first dielectric plate in substantially a first sinusoidal pattern, the second set of wires may be applied to the first dielectric plate in substantially a second sinusoidal pattern, the third set of wires may be applied to the second dielectric plate in substantially a third sinusoidal pattern, and the fourth set of wires may be applied to the second dielectric plate in substantially a fourth sinusoidal pattern. The first sinusoidal pattern may be approximately in-phase with the second sinusoidal pattern and the third sinusoidal pattern may be approximately in-phase with the fourth sinusoidal pattern. In some embodiments, the first and second sinusoidal patterns may be between 120 degrees and 240 degrees out-of-phase relative to the third and fourth sinusoidal patterns. In other embodiments, the first and second sinusoidal patterns may be between 150 degrees and 210 degrees out-of-phase relative to the third and fourth sinusoidal patterns. In other embodiments, the first and second sinusoidal patterns may be between 170 degrees and 190 degrees out-of-phase relative to the third and fourth sinusoidal patterns. In still other embodiments, the first and second sinusoidal patterns may be approximately 180 degrees out-of-phase relative to the third and fourth sinusoidal patterns. In some embodiments, the first, second, third, and fourth sinusoidal patterns may be applied to each having a decreasing wavelength pattern relative to an entry port of the quadrupole electric field channel and an exit port of the quadrupole electric field channel. In other embodiments, non-sinusoidal patterns may be used. For example, sawtooth (i.e. triangular) patterns, square/rectangular patterns, or the like may be used.

In some embodiments, the sinusoidal patterns and or non-sinusoidal patterns for guiding neutral polar molecules may have substantially constant wavelengths. The apparatus may be further configured for the electric field configurations to operate with a decreasing frequency as a packet of gas including the neutral polar molecules transverses the quadrupole electric field channel. (I.E. A decreasing frequency burst of the electric field configuration transition is applied and repeated with each packet of gas transverses the quadrupole electric field channel.

In another embodiment a method is disclosed for implementation on RFQ-SD. The RFQ-SD includes two dielectric plates having substantially planar shapes. The first dielectric plate includes a first set of wires being attached onto a surface of the first dielectric plate and a second set of wires being attached onto the surface of the first dielectric plate. The first set of wires and the second set of wires each include a plurality of electrically conductive wires each being located parallel to one another. The first dielectric plate also includes a first interconnecting wire for connecting one end of each of the first set of wires and a second interconnecting wire for connecting one end of each of the second set of wires. The first set of wires is interdigitated with the second set of wires. The first interconnecting wire and the second interconnecting wire are located on opposite edges of the first dielectric plate.

The second dielectric plate has a substantially planar shape matching the first dielectric plate. The second dielectric plate includes a third set of wires being attached onto a surface of the second dielectric plate and a fourth set of wires being attached onto the surface of the second dielectric plate. The third set of wires and the fourth set of wires include a plurality of electrically conductive wires each being located parallel to one another. The second dielectric plate also includes a third electrically conductive interconnecting wire for connecting one end of each of the third set of wires and a fourth electrically conductive interconnecting wire for connecting one end of each of the fourth set of wires. The third set of wires is interdigitated with the fourth set of wires. The third electrically conductive interconnecting wire and the fourth electrically conductive interconnecting wire are located on opposite edges of the second dielectric plate.

The first dielectric plate and the second dielectric plate are spaced apart such that every four wires, two wires from the first dielectric plate and two wires from the second dielectric plate, form a quadrupole electric field channel for guiding neutral polar molecules.

The method includes a plurality of electric field configurations. In a first electric field configuration, the method includes applying a positive voltage to a first wire of the quadrupole electric field channel, applying a negative voltage to a second wire of the quadrupole electric field channel, and applying substantially no voltage (or a DC voltage) to a third wire and a fourth wire of the quadrupole electric field channel. In a second electric field configuration, the method includes applying the positive voltage to the third wire of the quadrupole electric field channel, applying the negative voltage to the fourth wire of the quadrupole electric field channel, and applying substantially no voltage to the first and second wires of the quadrupole electric field channel. The method further includes switching the quadrupole electric field channel between the first electric field configuration and the second electric field configuration at a frequency over a period of time. In the second electric field configuration, the voltages applied to each of the wires are reversed in order to rotate the electric field direction within the channel. It may also be noted that non-zero voltages may also be applied, instead of zero volts mentioned above, as a way to prevent low field seeking (LFS) and high field seeking (HFS) state changing transitions.

In some embodiments, the method may include switching the quadrupole electric field channel between the first electric field configuration and the second electric field configuration in a sinusoidal manner. In some embodiments, the frequency may be within a range of 1 kilohertz (kHz) to 10 kHz. In other embodiments, the frequency may be within a range of 10 kHz to 100 kHz. In still other embodiments, the frequency may be within a range of 100 kHz to 1 megahertz (MHz). In still other embodiments, the frequency may be within a range of 1 MHz to 10 MHz. In still other embodiments, the frequency may be within a range of 10 MHz to 100 MHz. In some embodiments, the positive voltage may be between +30 volts and +300 volts, and the negative voltage may be between −30 volts and −300 volts. In other embodiments, the positive voltage may be between +300 volts and +3000 volts, and the negative voltage may be between −300 volts and −3000 volts. In still other embodiments, the positive voltage may be between +3000 volts and +30,000 volts, and the negative voltage may be between −3000 volts and −30,000 volts.

In some embodiments, the method may further include passing one or more neutral polar molecules between the first dielectric plate and the second dielectric plate in a direction of the quadrupole electric field channel.

In some embodiments, the method may further include discriminating the polar molecules based on their mass-to-dipole moment ratios.

In some embodiments, discriminating the polar molecules based on their mass-to-dipole moment ratios may include only passing molecules through a gap between the first dielectric plate and the second dielectric plate within a range of mass-to-dipole moment ratios.

In some embodiments, the method may further include decelerating the neutral polar molecules as they traverse lengths of the quadrupole electric field channel.

According to another embodiment, an apparatus is disclosed for implementing a radio frequency hexapole stark decelerator. The radio frequency hexapole stark decelerator includes two dielectric plates.

The first dielectric plate includes a first set of wires being attached onto a surface of the first dielectric plate, a second set of wires being attached onto the surface of the first dielectric plate, a third set of wires being attached onto the surface of the first dielectric plate, and a fourth set of wires being attached onto the surface of the first dielectric plate. The first set of wires, the second set of wires, the third set of wires, and the fourth set of wires each include a plurality of electrically conductive wires each being located parallel to one another. The first dielectric plate further includes a first interconnecting wire for connecting one end of each of the first set of wires, a second interconnecting wire for connecting one end of each of the second set of wires, a third interconnecting wire for connecting one end of each of the third set of wires, and a fourth interconnecting wire for connecting one end of each of the fourth set of wires. The first set of wires, the second set of wires, the third set of wires, and the fourth set of wires are interdigitated. The first interconnecting wire and the second interconnecting wire are located on opposite edges of the first dielectric plate, and the third interconnecting wire and the fourth interconnecting wire are located on opposite edges of the first dielectric plate.

The second dielectric plate has a substantially planar shape. The second dielectric plate includes a fifth set of wires being attached onto a surface of the second dielectric plate, and a sixth set of wires being attached onto the surface of the second dielectric plate. The fifth set of wires and the sixth set of wires include a plurality of electrically conductive wires each being located parallel to one another. The second dielectric plate also includes a fifth electrically conductive interconnecting wire for connecting one end of each of the fifth set of wires and a sixth electrically conductive interconnecting wire for connecting one end of each of the sixth set of wires. The fifth set of wires is interdigitated with the sixth set of wires. The fifth electrically conductive interconnecting wire and the sixth electrically conductive interconnecting wire are located on opposite edges of the second dielectric plate.

The first dielectric plate and the second dielectric plate are spaced apart such that every six wires, four wires from the first dielectric plate and two wires from the second dielectric plate, form a hexapole electric field channel for guiding neutral polar molecules.

According to another embodiment, an apparatus is disclosed for implementing a radio frequency octupole stark decelerator. The radio frequency octupole stark decelerator includes two dielectric plates having substantially the same shape.

The first dielectric plate includes a first set of wires being attached onto a surface of the first dielectric plate, a second set of wires being attached onto the surface of the first dielectric plate, a third set of wires being attached onto the surface of the first dielectric plate, and a fourth set of wires being attached onto the surface of the first dielectric plate. The first set of wires, the second set of wires, the third set of wires, and the fourth set of wires each include a plurality of electrically conductive wires each being located parallel to one another. The first dielectric plate further includes a first interconnecting wire for connecting one end of each of the first set of wires, a second interconnecting wire for connecting one end of each of the second set of wires, a third interconnecting wire for connecting one end of each of the third set of wires, and a fourth interconnecting wire for connecting one end of each of the fourth set of wires. The first set of wires, the second set of wires, the third set of wires, and the fourth set of wires are interdigitated. The first interconnecting wire and the second interconnecting wire are located on opposite edges of the first dielectric plate, and the third interconnecting wire and the fourth interconnecting wire are located on opposite edges of the first dielectric plate.

The second dielectric plate includes a fifth set of wires being attached onto a surface of the second dielectric plate, a sixth set of wires being attached onto the surface of the second dielectric plate, a seventh set of wires being attached onto the surface of the second dielectric plate, and an eighth set of wires being attached onto the surface of the second dielectric plate. The fifth set wires, the sixth set of wires, the seventh set of wires, and the eighth set of wires include a plurality of electrically conductive wires each being located parallel to one another. The second dielectric plate also includes a fifth electrically conductive interconnecting wire for connecting one end of each of the fifth set of wires, a sixth electrically conductive interconnecting wire for connecting one end of each of the sixth set of wires, a seventh electrically conductive interconnecting wire for connecting one end of each of the seventh set of wires, and an eighth electrically conductive interconnecting wire for connecting one end of each of the eighth set of wires. The fifth set of wires, the sixth set of wires, the seventh set of wires, and the eighth set of wires are interdigitated. The fifth electrically conductive interconnecting wire and the sixth electrically conductive interconnecting wire are located on opposite edges of the second dielectric plate. The seventh electrically conductive interconnecting wire and the eighth electrically conductive interconnecting wire are located on opposite edges of the second dielectric plate.

The first dielectric plate and the second dielectric plate are spaced apart such that every eight wires, four wires from the first dielectric plate and four wires from the second dielectric plate, form an octupole electric field channel for guiding neutral polar molecules.

BRIEF DESCRIPTION OF THE DRAWINGS

The present embodiments are illustrated by way of example and are not intended to be limited by the figures of the accompanying drawings. In the drawings:

FIG. 3 further depicts a second (right) diagram illustrating four wires forming a channel, as described above (there are multiple channels in the device) according to embodiments of the subject matter described herein.

FIG. 5 further depicts a second (right) diagram illustrating a first configuration and a second configuration, applying a positive and negative voltage combination to a first wire pair located in opposite corners of the channel according to embodiments of the subject matter described herein.

DETAILED DESCRIPTION

Figure 1:
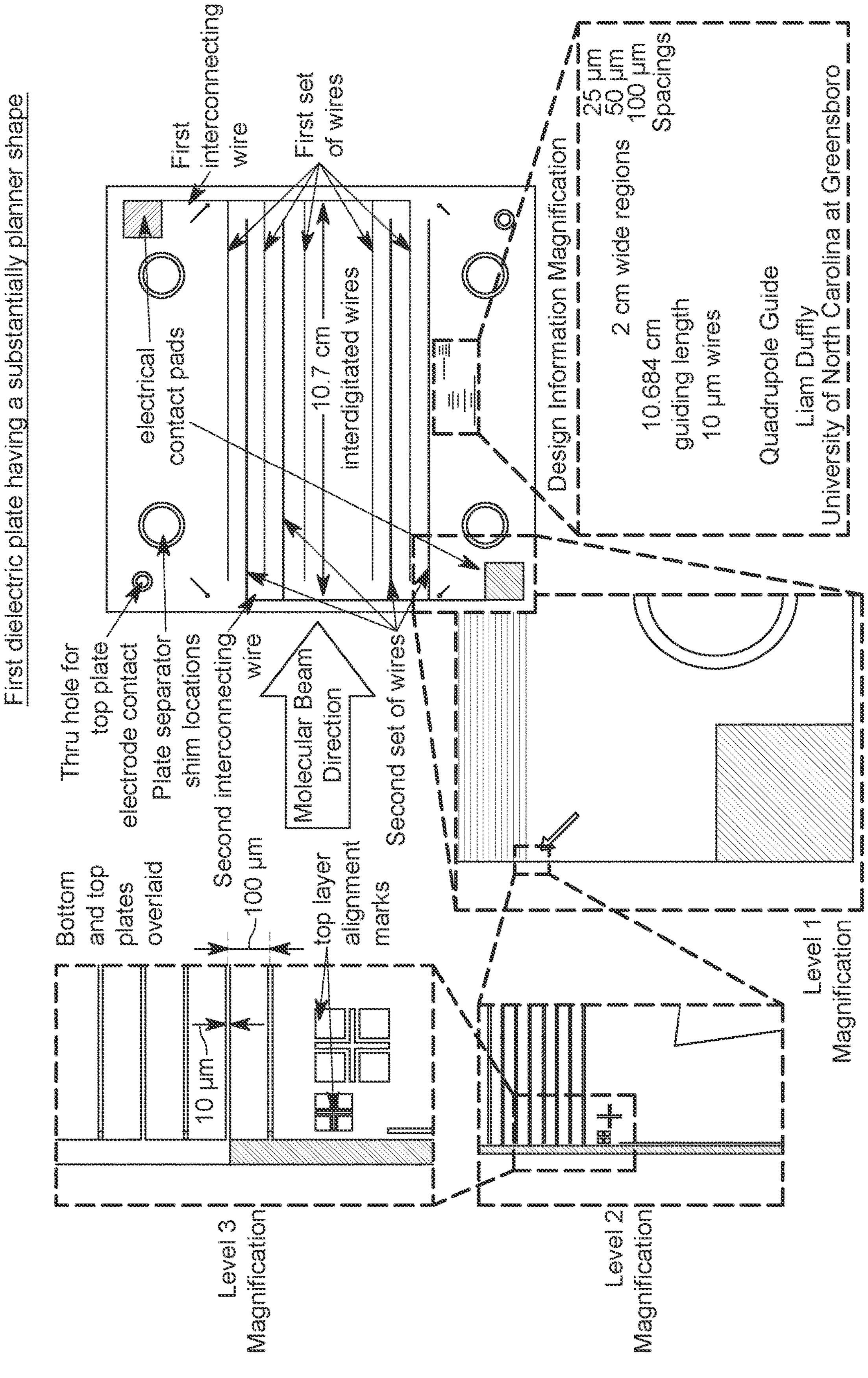
FIG. 1 depicts a diagram illustrating several levels of magnifications of a single dielectric plate having a plurality of straight wires according to embodiments of the subject matter described herein.

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The subject matter described herein includes a miniaturized and planarized radio frequency quadrupole stark decelerator (RFQ-SD). In contrast to a conventional three-dimensional and/or macroscopic RFQ which accelerates ions based on their mass-to-charge ratios and therefore are: unable to discriminate based on mass-to-dipole moment ratio, unable to work on net neutral polar molecules, unable to work on polar molecules in their ground state (high-field seeking states), and unable to distinguish or identify isomers, the present disclosure provides for separating, guiding, and/or decelerating neutral polar gas molecules by dipole moment. It may be noted that the device disclosed herein may also work for ions. If straight wires are used and much lower voltages, the quadrupole field channels will act as an array of conventional quadrupole mass spectrometers, identifying and discriminating molecules by their mass to charge ratios. In such a case, acceleration or deceleration of the ions may not be required for good mass resolution as DC fields may be swept in time to decrease the acceptable mass selective window. Using the accelerating or decelerating from the RFQ structures may be considered an alternative way to narrow the window/increase the mass resolution of the device.

In short, three technologies relate to the invention described herein. First, RFQs used to accelerate ions for high energy physics. Second, SDs used for decelerating neutral polar molecules for cold chemical physics experiments. Third, mass spectrometers used for identifying/discriminating molecules by their mass to charge ratio. The present invention relates to a mass spectrometer-like device that identifies/discriminates molecules by mass to dipole moment ratio. To do so, the present invention may use a miniaturized and planarized RFQ design that works on polar molecules instead of ions and slows them down.

As will be described herein, the RFQ-SD includes two dielectric (e.g., glass, silicon, etc.) plates having a plurality of wires patterned thereon forming a plurality of quadrupole field channels. By placing these miniaturized quadrupole field channels together in a plane between the two plates, neutral polar gas molecules can be passed through the channels while applying alternating electric field configurations in order to affect the molecules based on their mass-to-dipole moment ratios. It may be appreciated that the device separates molecules by their mass to "effective" dipole moment ratio. Molecules have a permanent dipole moment, but in an electric field it is the average projection of the permanent dipole moment along the field direction that is measurable. As the field strength increases, the effective dipole moment grows as the projection aligns with the field. In the limit of infinite field, the effective dipole moment becomes equal to the permanent dipole moment. Thus, wherever herein "mass to dipole moment ratio" is used, it refers to mass to "effective" dipole moment ratio. Polar molecules have a charge imbalance across them that is quantified by their molecular dipole moment, which in turn depends on the constituent atoms, types of bonds, and overall shape of the molecule. Under very high electric fields, polar molecules experience forces from the Stark Effect. While these forces are small compared to forces felt by ions, they are large enough to alter and manipulate their trajectories. While the Stark Effect has been used to decelerate molecules, these principles have not yet been combined with a microscopic and planar quadrupole guide.

For example, the first dielectric plate has a substantially planar (i.e., two-dimensional) shape and includes a first and a second set of wires attached onto a surface of the first dielectric plate. The first and second sets of wires each include a plurality of electrically conductive wires, each of the individual wires being located parallel to one another. A first interconnecting wire connects one end of each of the first set of wires. A second interconnecting wire connects one end of each of the second set of wires. The first set of wires is interdigitated with the second set of wires, and the first and second interconnecting wires are located on opposite edges of the first dielectric plate. A second dielectric plate is substantially similar to the first dielectric plate. The plates are spaced apart such that every four wires, two wires from the first dielectric plate and two wires from the second dielectric plate, form a quadrupole electric field channel for guiding neutral polar molecules.

A method for operating the apparatus may include switching each of the quadrupole field channels in the apparatus between a first electric field configuration and a second electric field configuration at a frequency over a period of time. In the first electric field configuration (see Scheme 1 layout in FIG. 7), a positive voltage is applied to a first wire (A) of the quadrupole field channel, a negative voltage is applied to a second wire (D) of the quadrupole field channel, and substantially no voltage is applied to a third and a fourth wire (B&C) of the quadrupole field channel. In the second electric field configuration, the voltages applied to each of the wires is switched (A & D→0, B→+ and C→−) in order to rotate the electric field direction and Stark forces by 90 degrees within the channel.

According to another embodiment, the polar molecules are decelerated as they traverse the lengths of the quadrupole field channels. The sets of wires on each of the first and second dielectric plates are sinusoidally patterned such that an effective sinusoidal wavelength of the wires shortens to match the shorter distances traveled by the slowing polar molecules as they traverse the quadrupole field channels.

FIG. 1 is a diagram illustrating several levels of magnifications of a single dielectric plate having a plurality of straight wires according to an embodiment of the subject matter described herein. With reference now to FIG. 1, the device may include two planar dielectric sheets being parallel to one another and spaced apart by a small distance which will be described in greater detail below. In the embodiment shown, each planar dielectric sheet is a glass plate. It is appreciated, however, that other dielectrics, such as silicon, may also be used. For simplicity of discussion, the pair of opposing planar dielectric sheets will be referred to simply as "plates" or "glass plates".

Each glass plate may include a plurality of metal wires. These wires may be etched into the glass plate or may be layered on top of the surface of each plate. The wires may be deposited precisely using, for example, photolithography. The wires may be spaced apart from each other on each plate based on various factors. In one embodiment, 10 μm wires may have a spacing of approximately 100 μm. While the embodiment shown in FIG. 1 includes straight wires, other configurations that include curved wires, including wires having a consistent curvature along their lengths or wires having variable curvature along their lengths, are also within the scope of the subject matter described herein and will be described in greater detail below.

On each of the two glass plates, which have been patterned with micron-scale metallic (conductive) wires, wires may be configured such that the wires are connected together and interdigitated with the connected set of wires on the opposite side of the plate. This allows for a first set of wires and a second set of wires to be patterned into a single plate and operated independently. Each set of wires may be spaced apart such that the opposing set of wires are interdigitated to produce an overall equal spacing of the wires. The lengths of each set of wires may be shorter than the width of the plate such that they do not overlap or otherwise electrically connect with the opposing set of wires.

It is also appreciated that, in one possible embodiment, the spine wire that connects to all the channel wires can also be placed under a dielectric to shield its field from the molecules passing over it. While there may be deflecting forces, they may be small.

Individual wires in each set of wires on the plate (illustrated in FIG. 1 as multiple horizontal lines) is connected together by a spine wire, which appears as a vertical line on the right side of the plate connecting the wires of the first set and appears as a vertical line on the left side of the plate connecting the wires of the second set. These spine wires may be connected to electrical contact pads which may be used to provide and control the charging and discharging of each of the sets of wires. These electrical contact pads appear as squares located in opposite corners of the bottom glass plate shown in FIG. 1. For example, the square-shaped electrical contact pad located in the upper right portion of the glass plate may be connected to the right-side spine wire for the first set of wires. Similarly, the square-shaped electrical contact pad located in the lower left portion of the glass plate may be connected to the left-side spine wire for the second set of wires.

The glass plate shown in FIG. 1 is one of two similar plates that are included in the device described herein. These plates may be overlaid on top of one another and spaced apart using plate separator shims. Four plate separator shim locations are shown in FIG. 1 for inserting four 100 μm non-conductive (e.g., plastic) plate separator shims. Additionally, each plate may include one or more alignment marks for aligning the plates relative to one another. For example, this is illustrated in the upper left portion of FIG. 1 where two plates (bottom and top) are overlaid using the alignment marks.

Figure 2:
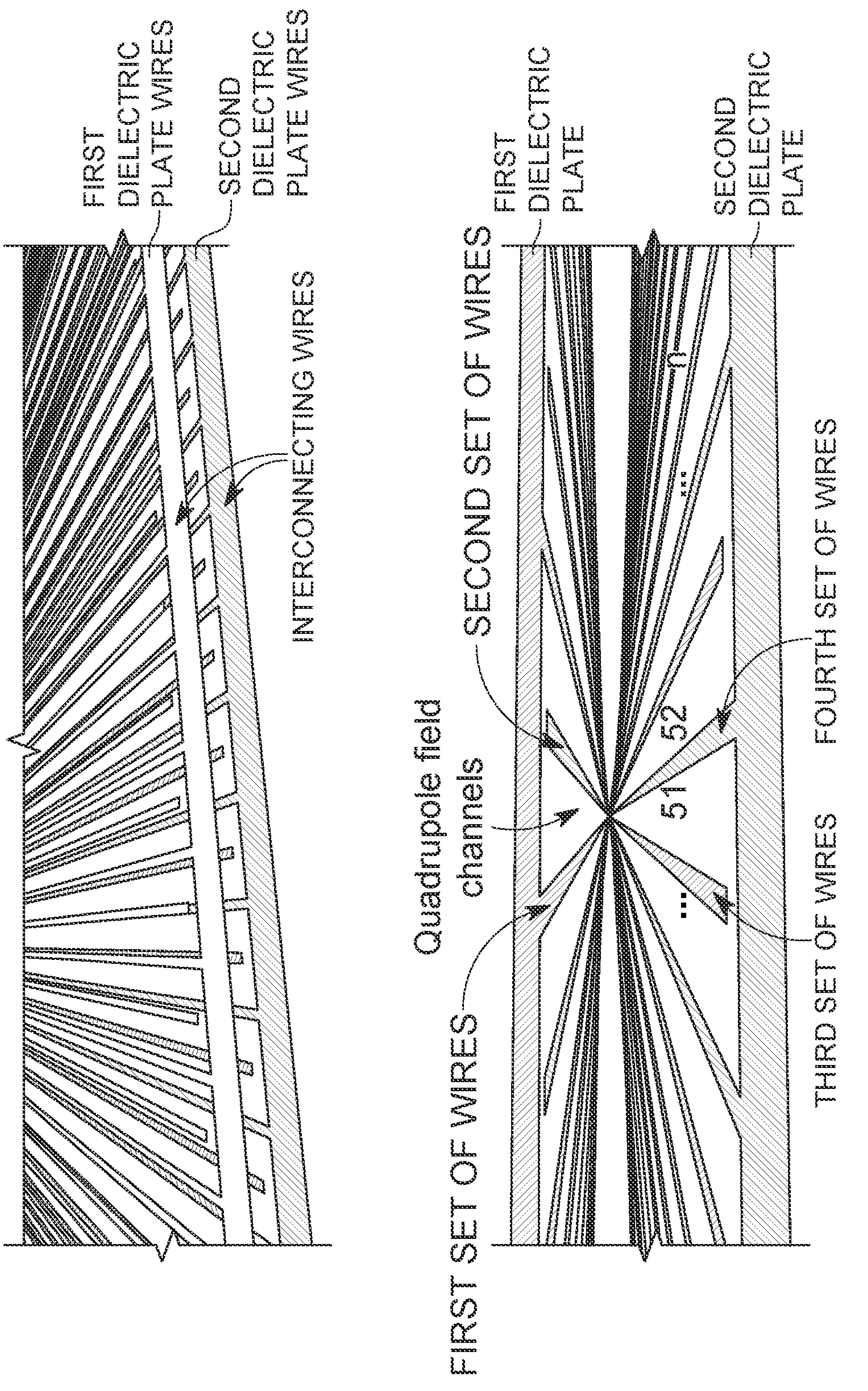
FIG. 2 depicts a view between the glass plates from FIG. 1. It is appreciated that the direction of molecules enters the device from the observer's point of view and travels away from the observer (or vice versa) according to embodiments of the subject matter described herein.

FIG. 2 shows a view between the glass plates from FIG. 1. It is appreciated that the direction of molecules enters the device from the observer's point of view and travels away from the observer (or vice versa). This allows the molecules to travel in the same direction as the plurality of wires which are patterned onto each plate.

The spine (i.e. interconnecting) wires (two for each plate) are configured such that they may have minimal or no impact on the molecules which cross of them, either entering or exiting the space between the plates. For example, assuming the spine wires produced an electric field at the time one or more molecules crossed them, the amount of time, distance, and size of the field would be small relative to the amount of time, distance, and size of the fields along the lengths of the wires. Alternatively, a thin dielectric layer may be put over the spines to weaken the effective electric field emanating from them.

Referring again to FIG. 2, viewed from the perspective between the plates, each set of four wires (two top wires from the top plate and two bottom wires from the bottom plate) which are located closest together may form a square shaped channel. Each of these square-shaped channels are located side-by-side along the plane between the two plates. The number of quadrupole field channels may be calculated as the total number of wires, minus two, then divided in half. For example, 12 wires (6 top wires and 6 bottom wires) may result in a total of 5 quadrupole field channels.

The spacing between the plates may be varied. Larger throughput of molecules through the device may be achieved by using as large a separation between the plates and as large an electric field as possible. Conversely, however, if low voltages are desired, then the plates may be spaced closer together spacing and less throughput would result.

It may also be appreciated that while the cross-sectional shape of the metallic wires shown in FIG. 1 and FIG. 2 are rectangular and/or flat, the cross-sectional shape of the wires may be varied without departing from the scope of the invention. In many embodiments, the wires may appear as point charges based on their geometry and/or size. However, it is also possible to vary the cross-sectional shape and/or size of the wires at different points along their lengths. For example, each of the wires may be thicker on the side of the plates where molecules enter the device and may be thinner on the side of the plates there the molecules exit the device.

Figure 3:
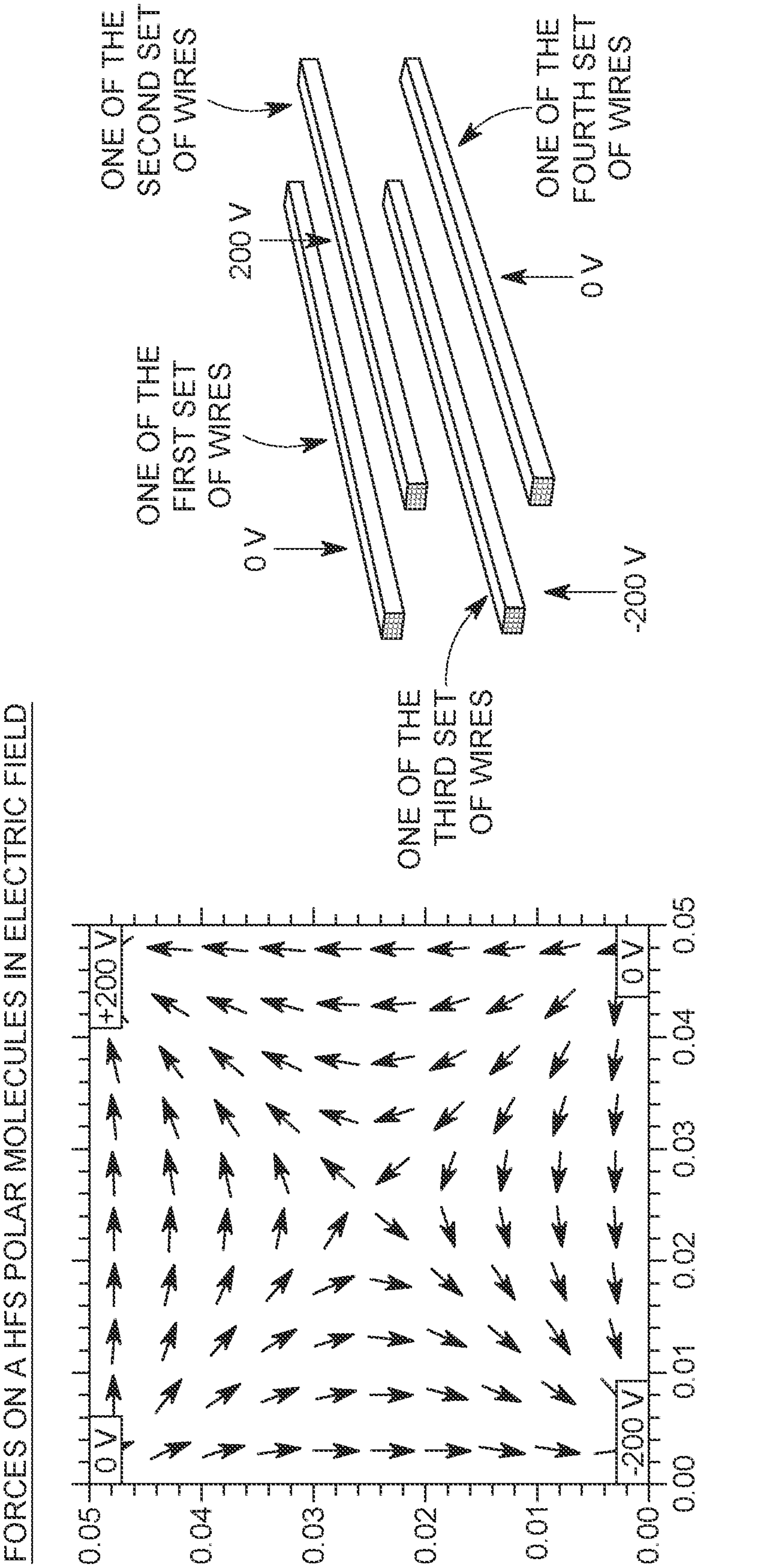
FIG. 3 depicts a first (left) diagram illustrating exemplary forces on a polar molecule in an electric field according to embodiments of the subject matter described herein.

FIG. 3 shows exemplary forces on a high field seeking (HFS) polar molecule in an electric field according to an embodiment of the subject matter described herein. Referring to FIG. 3, the right-hand diagram illustrates four wires forming a channel, as described above (there are multiple channels in the device). Different voltages may be applied to each of the four wires. In a first configuration, a first wire from the top plate may be logically paired with a first wire on the bottom plate where the wires on located on opposite corners of the square-shaped channel. In other words, logically 'paired' wires are not located directly above or below each other. Similarly, a second pair of wires may include a second wire from the top plate and a second wire from the bottom plate, on opposite corners. In the first configuration, a positive voltage may be applied to the first wire (right wire on the top plate) and an equally negative voltage may be applied to its paired wire (the left/first wire on the bottom plate). While these positive and negative voltages are applied to the first pair of wires, a zero voltage may be applied to the second pair of wires.

This first configuration may produce an electric field along the length/inside the channel as shown in the left portion of FIG. 3. As shown, HFS polar molecules in the channel may experience a force pushing the molecule toward the first set of wires (positive and negative voltages) and a force away from the neutral 0 voltage second set of wires. As mentioned earlier, to avoid low field seeking (LFS)/HFS state transitions, small non-zero voltages may also be applied.

In a second configuration, the voltages applied to each of the pairs of wires may be reversed. For example, substantially zero volts may be applied to the first set of wires (upper right and lower left) while +/−200 volts may be applied to the upper left and lower right wires, respectively. This also changes the direction of the forces on a polar molecule in the electric field in the channel.

By alternating the first and second configurations over time, molecules may be dynamically guided through the channel. The amount of guiding may be determined by the forces exerts on the molecules, which depend on the strength of the field, the spacing between the wires, the frequency of the alternating configurations, the mass/dipole moment ratio of the molecules, and the energy/temperature/velocities of the molecules. For example, molecules with a higher dipole moments may experience stronger forces in a given electric field than molecules with a lower dipole moment. Also, the path of molecules may be more perturbed by stronger electric fields. Alternating the fields more slowly may allow the same electric field to apply forces to molecules for a longer period of time, thereby affecting its path more with light molecules deviating further that heavier molecules. Similarly, faster moving molecules may be perturbed less than slower moving molecules.

Figure 4:
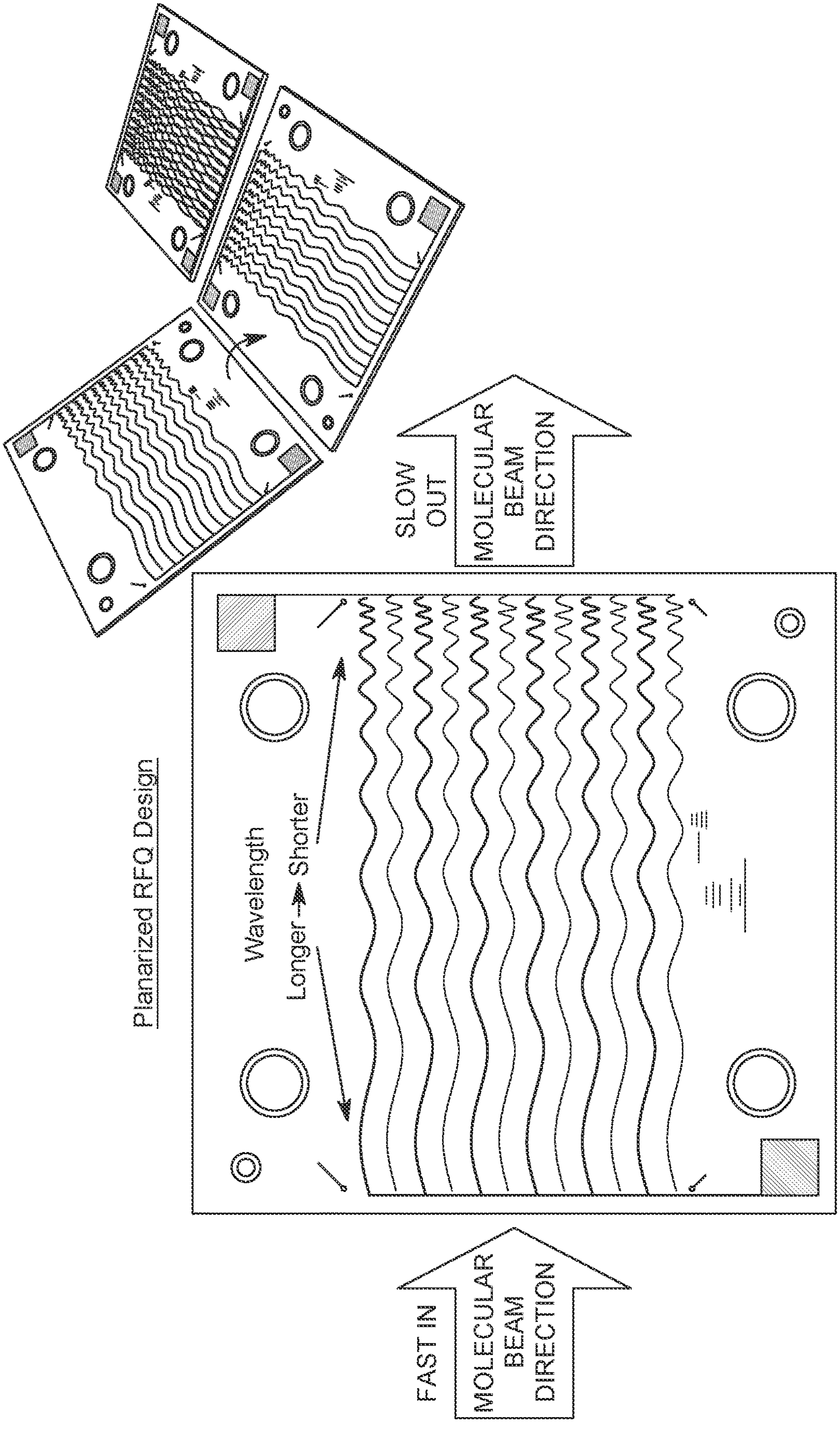
FIG. 4 depicts a diagram illustrating a configuration of the planarized and miniaturized quadrupole device where the plurality of wires is curved along their lengths, according to embodiments of the subject matter described herein.

FIG. 4 shows a configuration of the planarized and miniaturized quadrupole device where the wires are curved along their lengths, according to one embodiment of the subject matter described herein. Referring to FIG. 4, the m/μ resolution of the device may be enhanced over the configuration shown in FIG. 1 by sinusoidally patterning the wires. The side of the device where the molecular beam enters may have longer wavelengths of sinusoidal wire patterning. This wavelength may shorten across the length of the wires (here shown from left to right) such that the shortest wavelength of wire patterning is at the side of the device from which the slowed molecular beam exits (right side). If operated as a positive accelerator, molecules would traverse the device in the opposite direction.

It is further appreciated that the device has the effect of slowing or accelerating, in addition to guiding, bunching, and filtering, the molecular beam entering the device. The Stark potential in the forward direction of the molecules is perturbatively altered and through appropriate timing can be used to resonantly decelerate (or accelerate) a given m/μ. The patterning of the wires may be further configured such that the effective sinusoidal wavelength shortens to match the shorter distances traveled by the slowing molecules as they traverse the device. Unlike convention SDs, this allows the device to decelerate (or accelerate) a continuous stream of gas rather than a single pulse of gas at a time. This is because fast molecules entering the device experience the same electric field timing as the slow molecules exiting the device.

This method of decelerating molecules by shortening the sinusoidal wavelength of the wires in relation to the slowing of the molecules is similar to, but the reverse, of conventional macroscopic RFQs used for accelerating ion beams.

In one embodiment, additional elements may be added to the exit (i.e. downstream) of the device described herein for further focusing and/or merging the molecules from the plurality of individual channels to produce a higher-density slow(er) moving beam of molecules. Further possible downstream manipulation includes ionization including electron impact for ionizing all species or resonance enhanced multi photon ionization (REMPI) for state/conformer/isomer selective ionization) and detection or further study via mass spec techniques. Possible upstream manipulation includes enantiomer selection via coherent three level microwave absorption to leave enantiomers in different states prior to the device and hence allow their separation in the RFQ-SD.

Figure 5:
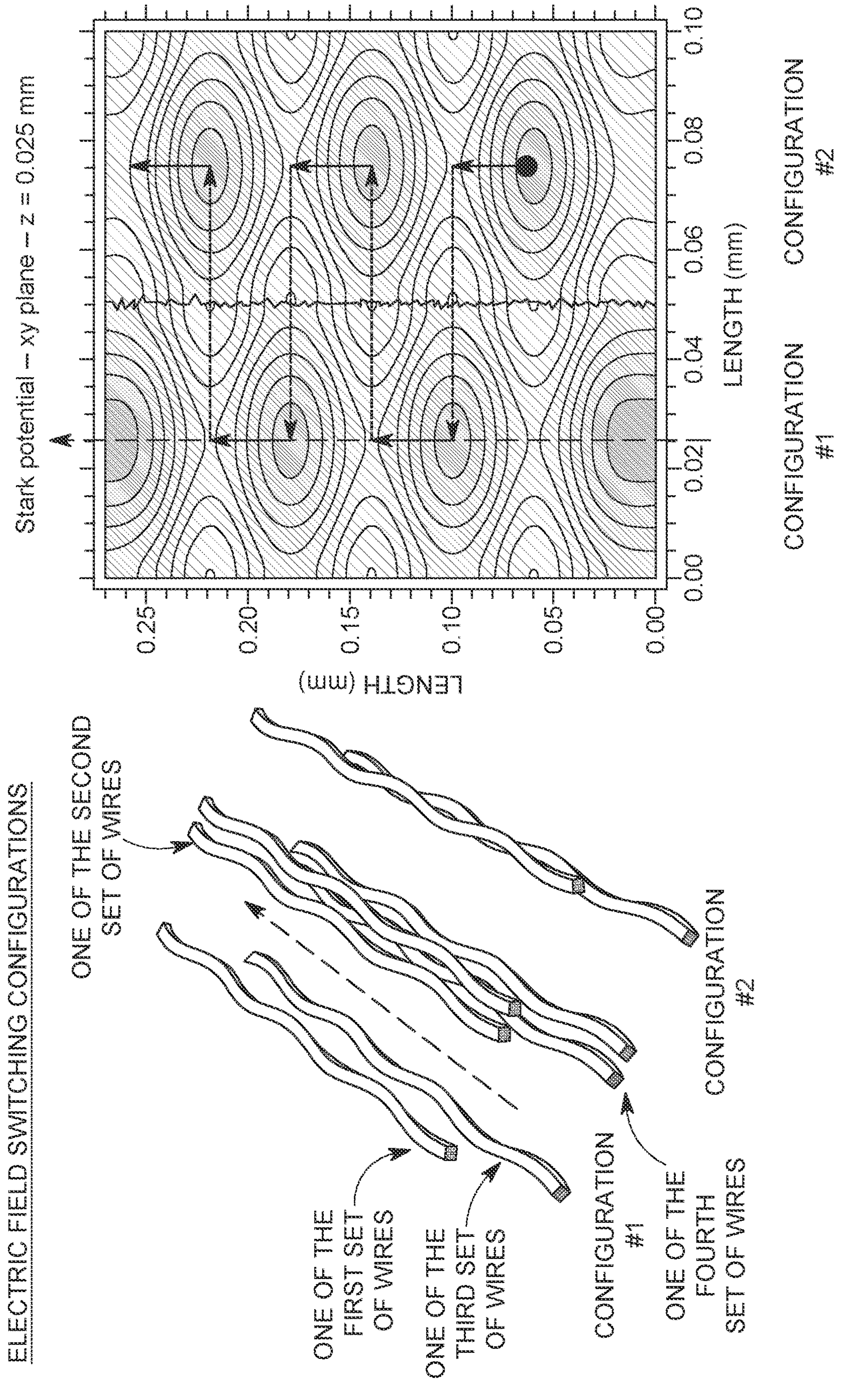
FIG. 5 depicts a first (left) diagram illustrating a three-dimensional view of sinusoidally patterned wires comprising a channel according to embodiments of the subject matter described herein. While it may appear from the zoomed-in view shown in FIG. 5 that the wavelength of the wires is constant, it is appreciated that the wires may be curved in a variety of configurations without departing from the scope of the subject matter described herein.

FIG. 5 is a 3-dimensional illustration of sinusoidally patterned wires comprising a channel according to an embodiment of the subject matter described herein. While it may appear from the zoomed-in view shown in FIG. 5 that the wavelength of the wires is constant, it is appreciated that the wires may be curved in a variety of configurations without departing from the scope of the subject matter described herein. For example, the portion of the wires shown in FIG. 5 may have a constant wavelength, but this may solely be the result of the segment of the wires shown. These same wires, at different locations within the device, may have longer or shorter wavelengths. Additionally, the curvature of the wires may be in configurations others than sinusoidal, may be constant along their entire lengths, may be different for different channels, may be a mixture of straight and curved segments, and/or may include any pattern of different wavelengths (not required to go only from long to short or short to long).

Referring to FIG. 5, in a first configuration, a positive and negative voltage combination is applied to a first wire pair located in opposite corners of the channel. Here, the bottom left and upper right wires. In this electric field configuration, the molecules in the molecular beam entering the channel may experience forces according to their Stark potential. As stated above, this may depend on the mass and dipole moment of each molecule, the strength of the field, the size of the channel, the velocity of the molecules, etc. This force may act against the direction of travel of the molecules and act to slow molecules down. Before the electric field in the first configuration would act to accelerate the molecules, the electric field configuration may be reversed by applying a voltage combination to the opposite pair of wires than in the first configuration.

In FIG. 5, this second electric field configuration would include applying a positive and negative voltage pair to the upper left and bottom right wires. In the second configuration, the forces applied to the molecules would be opposite to those in the first configuration. On the right hand portion of FIG. 5, these two Stark potentials are shown. It is appreciated that molecules traversing a channel do not 'jump' from one channel to another channel. Instead, FIG. 5 illustrates the two different electric field configurations that may exist within the same channel at different points in time. The timing of the switching between the first and second configurations may depend on a number of factors known to those of skill in the art.

Figure 6:
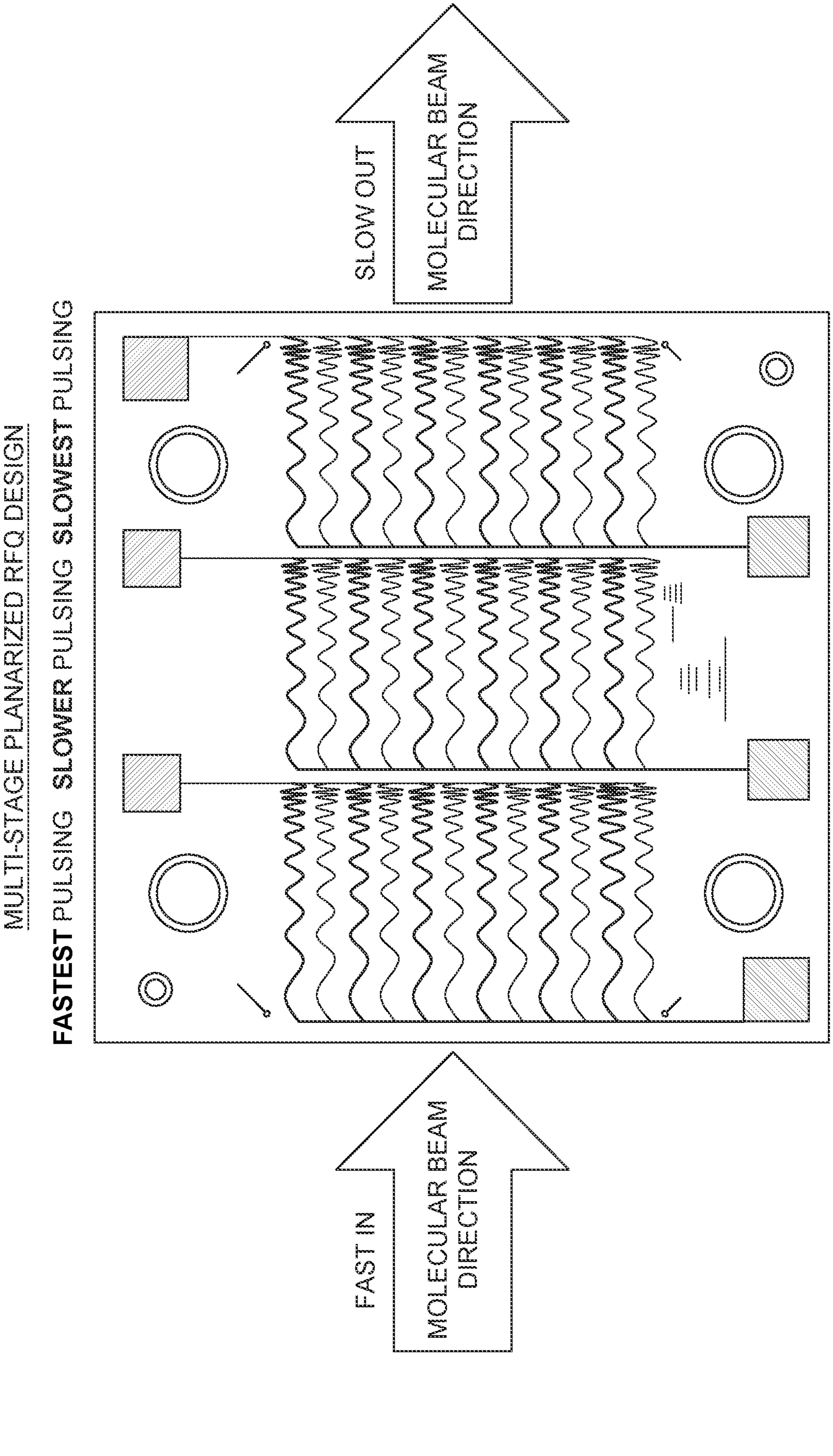
FIG. 6 depicts a diagram that is similar to FIG. 4 that illustrates the design of a multi-stage device according to embodiments of the subject matter described herein. Each stage is configured to have its own pulse timing. Such a multi-stage device allows for smaller overall devices.

FIG. 6 depicts a diagram that is similar to FIG. 4 that illustrates the design of a multi-stage device. Each stage is configured to have its own pulse timing. Such a multi-stage device allows for overall smaller overall devices.

Figure 7:
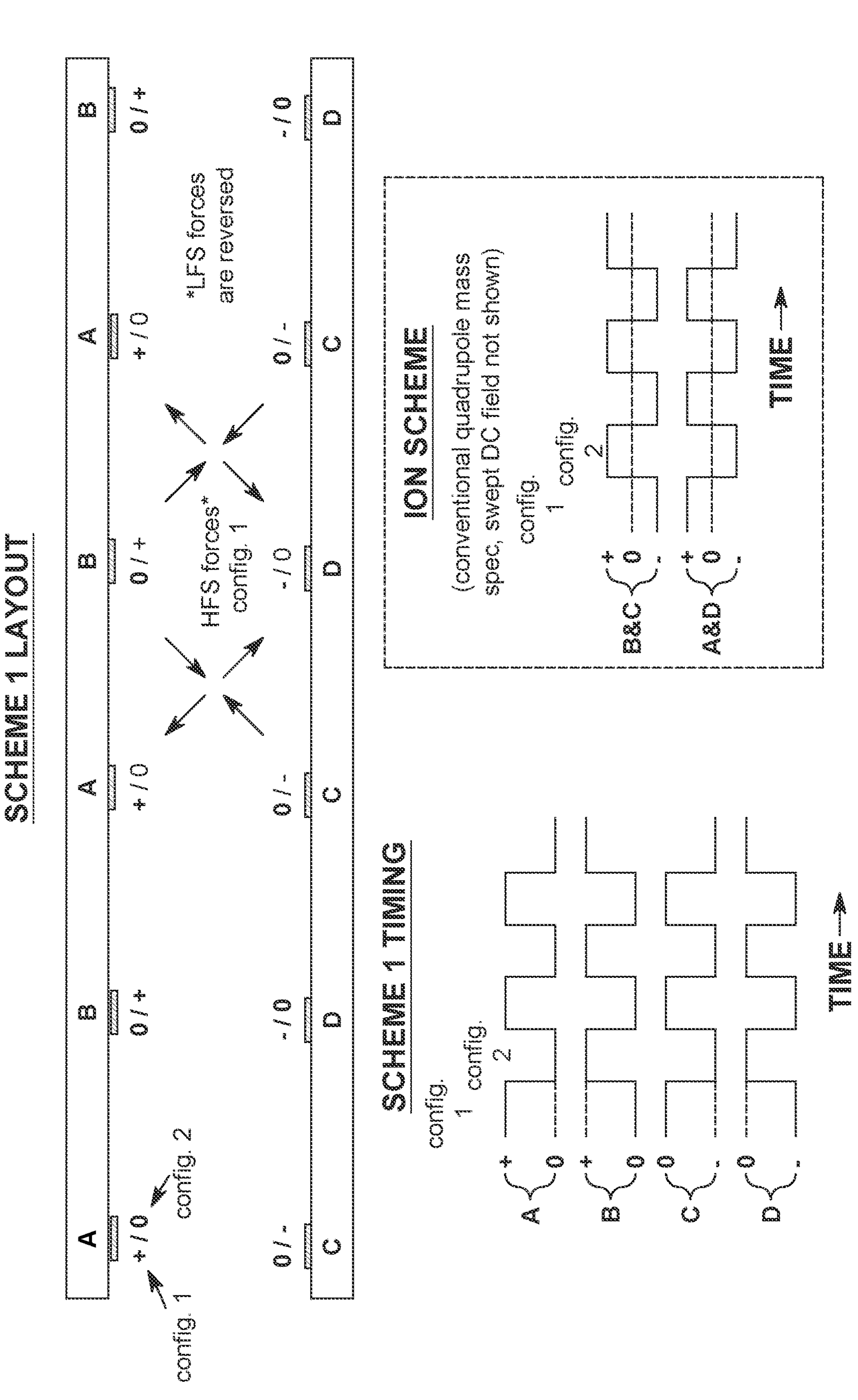
FIG. 7 and FIG. 8 illustrate possible electrode voltage and timing sequences according to embodiments of the subject matter described herein. Schemes 1 and Scheme 2*a* have both been successfully used in macroscopic quadrupole devices to guide neutral polar gas molecules. In certain embodiments, the depicted pulse timings may also be more complicated than depicted, e.g., sinusoidal fields may be used and/or turned off entirely to avoid moving the molecules through undesirable portions of the Stark potentials. An ion scheme is also illustrated to indicate that the miniaturized and planarized RFQSD could also simply operate as a RFQ for ions and work as a mass spectrometer, separating molecules by mass to charge ratio, as in a conventional quadrupole mass spectrometer.
Figure 8:
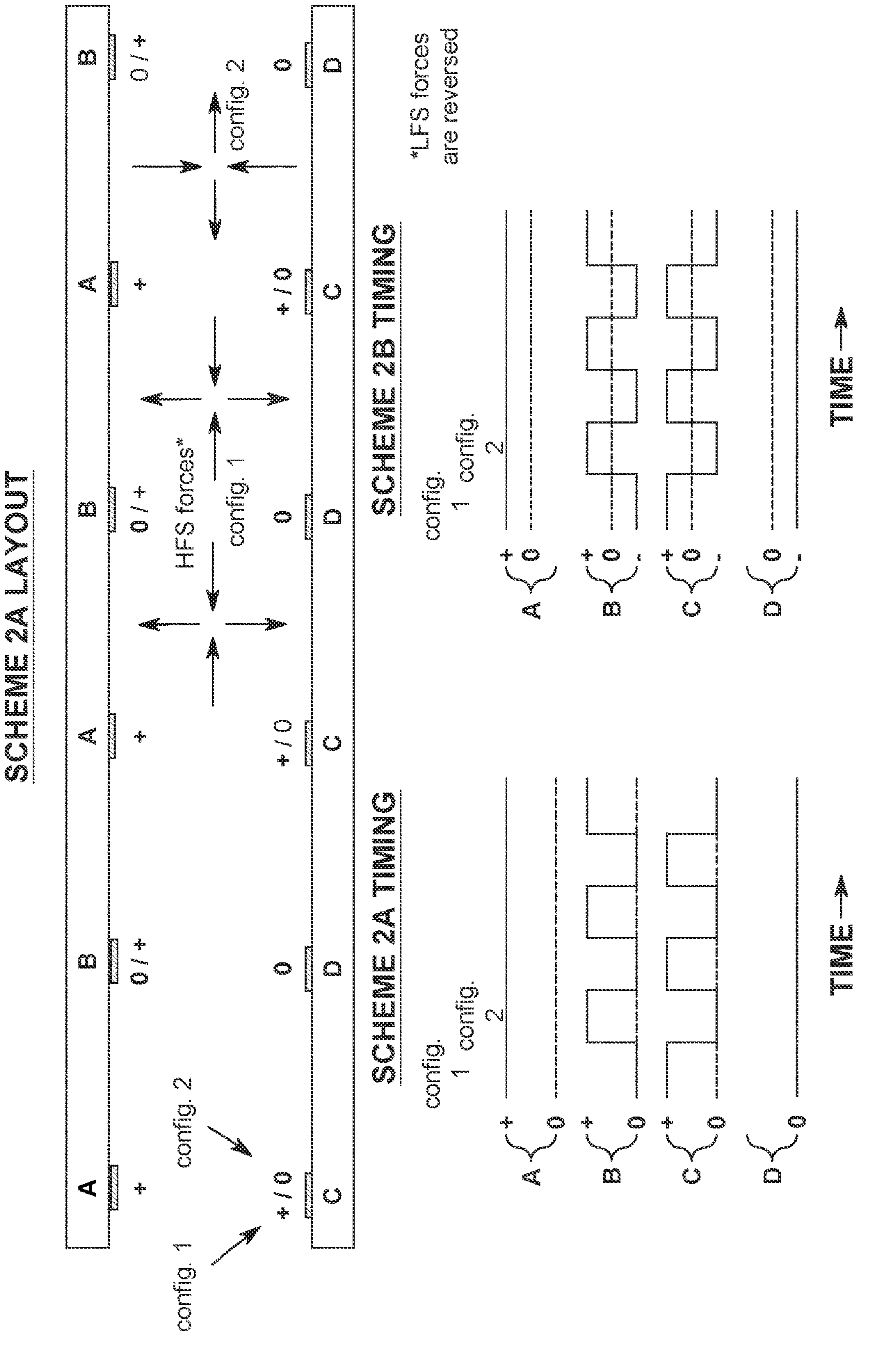

FIG. 7 and FIG. 8 illustrate possible electrode voltage and timing sequences. Schemes 1 and Scheme 2*a* have both been successfully used in macroscopic quadrupole devices to guide neutral polar gas molecules. In certain embodiments, the depicted pulse timings may also be more complicated than depicted. For example, sinusoidal fields may be used and/or turned off entirely to avoid moving the molecules through undesirable portions of the Stark potentials. An ion scheme is also illustrated to indicate that the miniaturized and planarized RFQSD could also simply operate as a RFQ for ions and works as a mass spectrometer, separating molecules by mass to charge ratio, as in a conventional quadrupole mass spectrometer.

Figure 9:
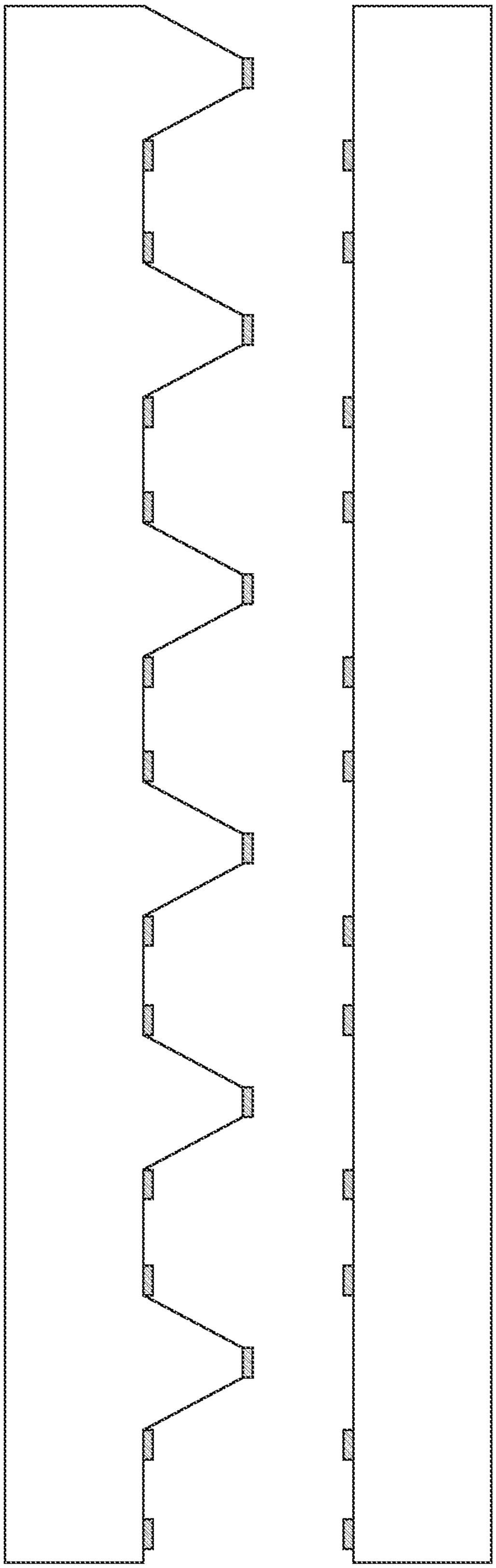
FIG. 9 depicts a diagram illustrating a planarized hexapole structure for guiding neutral polar molecules in accordance with embodiments of the present disclosure.

FIG. 9 illustrates a planarized RFQ design including methods that may be implemented upstream or downstream from the RFQSD, including enantiomer separation according to embodiments of the subject matter described herein. Possible upstream manipulation includes enantiomer selection via coherent three level microwave absorption to leave enantiomers in different states prior to the device and hence allow their separation in the RFQ-SD. Further downstream manipulation includes focusing, merging channels, ionization including electron impact for ionizing all species or resonance enhanced multi photon ionization (REMPI) for state/conformer/isomer selective ionization) and detection or further study via mass spec techniques.

FIG. 9 depicts a diagram illustrating a planarized hexapole guide in accordance with embodiments of the present disclosure. The planarized hexapole guide includes two dielectric plates.

The first dielectric plate of FIG. 9 includes a first set of wires being attached onto a surface of the first dielectric plate, a second set of wires being attached onto the surface of the first dielectric plate, a third set of wires being attached onto the surface of the first dielectric plate, and a fourth set of wires being attached onto the surface of the first dielectric plate. The first set of wires, the second set of wires, the third set of wires, and the fourth set of wires each include a plurality of electrically conductive wires each being located parallel to one another. The first dielectric plate further includes a first interconnecting wire for connecting one end of each of the first set of wires, a second interconnecting wire for connecting one end of each of the second set of wires, a third interconnecting wire for connecting one end of each of the third set of wires, and a fourth interconnecting wire for connecting one end of each of the fourth set of wires. The first set of wires, the second set of wires, the third set of wires, and the fourth set of wires are interdigitated. The first interconnecting wire and the second interconnecting wire are located on opposite edges of the first dielectric plate, and the third interconnecting wire and the fourth interconnecting wire are located on opposite edges of the first dielectric plate.

The second dielectric plate of FIG. 9 has a substantially planar shape. The second dielectric plate includes a fifth set of wires being attached onto a surface of the second dielectric plate, and a sixth set of wires being attached onto the surface of the second dielectric plate. The fifth set of wires and the sixth set of wires include a plurality of electrically conductive wires each being located parallel to one another. The second dielectric plate also includes a fifth electrically conductive interconnecting wire for connecting one end of each of the fifth set of wires and a sixth electrically conductive interconnecting wire for connecting one end of each of the sixth set of wires. The fifth set of wires is interdigitated with the sixth set of wires. The fifth electrically conductive interconnecting wire and the sixth electrically conductive interconnecting wire are located on opposite edges of the second dielectric plate.

The first dielectric plate and the second dielectric plate of FIG. 9 are spaced apart such that every six wires, four wires from the first dielectric plate and two wires from the second dielectric plate, form a hexapole electric field channel for guiding neutral polar molecules.

Figure 10:
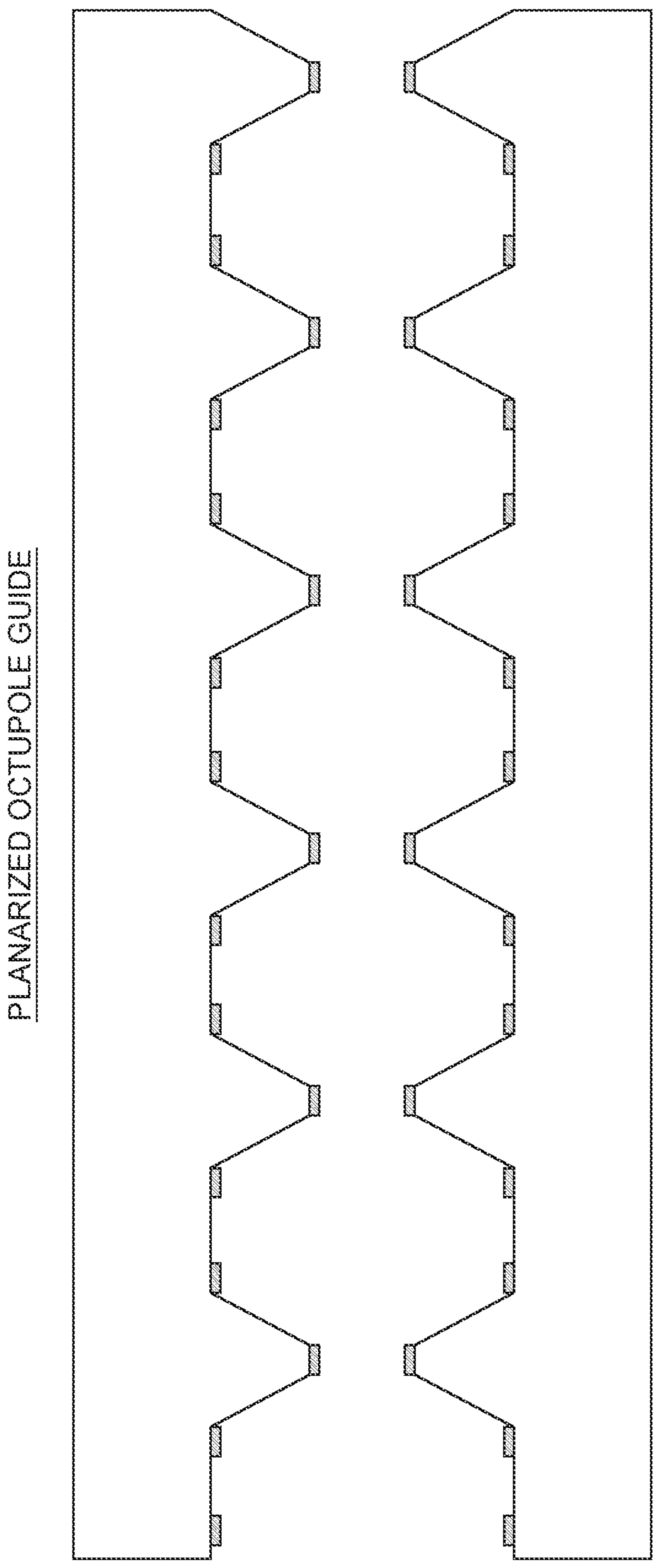
FIG. 10 depicts a diagram illustrating a planarized octupole structure for guiding neutral polar molecules in accordance with embodiments of the present disclosure.

FIG. 10 depicts a diagram illustrating a planarized octupole guide in accordance with embodiments of the present disclosure. The planarized octupole includes two dielectric plates having substantially the same shape.

The first dielectric plate of FIG. 10 includes a first set of wires being attached onto a surface of the first dielectric plate, a second set of wires being attached onto the surface of the first dielectric plate, a third set of wires being attached onto the surface of the first dielectric plate, and a fourth set of wires being attached onto the surface of the first dielectric plate. The first set of wires, the second set of wires, the third set of wires, and the fourth set of wires each include a plurality of electrically conductive wires each being located parallel to one another. The first dielectric plate further includes a first interconnecting wire for connecting one end of each of the first set of wires, a second interconnecting wire for connecting one end of each of the second set of wires, a third interconnecting wire for connecting one end of each of the third set of wires, and a fourth interconnecting wire for connecting one end of each of the fourth set of wires. The first set of wires, the second set of wires, the third set of wires, and the fourth set of wires are interdigitated. The first interconnecting wire and the second interconnecting wire are located on opposite edges of the first dielectric plate, and the third interconnecting wire and the fourth interconnecting wire are located on opposite edges of the first dielectric plate.

The second dielectric plate of FIG. 10 includes a fifth set of wires being attached onto a surface of the second dielectric plate, a sixth set of wires being attached onto the surface of the second dielectric plate, a seventh set of wires being attached onto the surface of the second dielectric plate, and an eighth set of wires being attached onto the surface of the second dielectric plate. The fifth set wires, the sixth set of wires, the seventh set of wires, and the eighth set of wires include a plurality of electrically conductive wires each being located parallel to one another. The second dielectric plate also includes a fifth electrically conductive interconnecting wire for connecting one end of each of the fifth set of wires, a sixth electrically conductive interconnecting wire for connecting one end of each of the sixth set of wires, a seventh electrically conductive interconnecting wire for connecting one end of each of the seventh set of wires, and an eighth electrically conductive interconnecting wire for connecting one end of each of the eighth set of wires. The fifth set of wires, the sixth set of wires, the seventh set of wires, and the eighth set of wires are interdigitated. The fifth electrically conductive interconnecting wire and the sixth electrically conductive interconnecting wire are located on opposite edges of the second dielectric plate. The seventh electrically conductive interconnecting wire and the eighth electrically conductive interconnecting wire are located on opposite edges of the second dielectric plate.

The first dielectric plate and the second dielectric plate of FIG. 10 are spaced apart such that every eight wires, four wires from the first dielectric plate and four wires from the second dielectric plate, form an octupole electric field channel for guiding neutral polar molecules.

Finally, however, it may be noted that for the sake of simplicity of calculation and/or simulation, the switching between electric field configurations for the same channel may be expressed as molecule(s) 'teleporting' between two different channels, each channel have a time-invariant/consistent electric field configuration. This, again, may aid in calculating the behavior of the device, but does not correspond to a physical reality of molecules within the device, which typically enter and exit the device through a single channel. As would be understood by one of ordinary skill in the art, it may be possible for unstable molecules from one channel to leak into and become stable in another channel, but this would not represent the typical path of molecules.

Immediate applications of quadrupole guiding and/or deceleration (or acceleration) of neutral polar gas molecules include but are not limited to: (1) mass to dipole moment spectrometry of fragile complexes that might fragment under conventional ionization (2) mass to dipole moment spectrometry of neutral components in conventional mass spectrometry (3) measurement of molecular dipole moments (4) determining and separating isomers (constitutional, diastereomers, tautomers, enantiomers (5) identification of nucleoside isomers (6) determining overall shapes of molecules (6) detecting subtle changes in molecular shape (7) determining relative isomer stabilities (8) detecting transient reaction intermediates such as radicals.

Future applications of sufficiently high-phase space density ultra-cold gas molecules include but are not limited to: (1) loading molecules into entangled traps to serve as qubits of a quantum computer (2) metrology devices such as creating better time/frequency standards (3) creating molecular Bose-Einstein condensates (4) measurement of the electron dipole moment (5) studying ultra-cold chemical reactions. These may be achieved, for example, using additional Stark-based focusing elements after molecules exit individual channels of the RFQ-SD described herein in order to form a tightly focused high phase-space density slow moving beam of molecules.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. An apparatus comprising:

a first dielectric plate having a substantially planar shape and the first dielectric plate includes:

a first set of wires being attached onto a surface of the first dielectric plate;

a second set of wires being attached onto the surface of the first dielectric plate, wherein the first set of wires and the second set of wires each include a plurality of electrically conductive wires each being located parallel to one another;

a first interconnecting wire for connecting one end of each of the first set of wires; and a second interconnecting wire for connecting one end of each of the second set of wires, wherein:

the first set of wires is interdigitated with the second set of wires; and the first interconnecting wire and the second interconnecting wire are located on opposite edges of the first dielectric plate;

and a second dielectric plate having a substantially planar shape matching the first dielectric plate and the second dielectric plate includes:

a third set of wires being attached onto a surface of the second dielectric plate;

a fourth set of wires being attached onto the surface of the second dielectric plate, wherein the third set of wires and the fourth set of wires include a plurality of electrically conductive wires each being located parallel to one another;

a third electrically conductive interconnecting wire for connecting one end of each of the third set of wires; and a fourth electrically conductive interconnecting wire for connecting one end of each of the fourth set of wires, wherein:

the third set of wires is interdigitated with the fourth set of wires;

the third electrically conductive interconnecting wire and the fourth electrically conductive interconnecting wire are located on opposite edges of the second dielectric plate; and the first dielectric plate and the second dielectric plate are spaced apart such that every four wires, two wires from the first dielectric plate and two wires from the second dielectric plate, form a quadrupole electric field channel for guiding neutral polar molecules.

2. The apparatus of claim 1, wherein at least one of the first set of wires, the second set of wires, the third set of wires, and the fourth set of wires are substantially sinusoidal in shape.

3. The apparatus of claim 1, wherein:

in a first electric field configuration, a positive voltage is applied to a first wire of the quadrupole electric field channel, a negative voltage is applied to a second wire of the quadrupole electric field channel, and substantially no voltage (or DC voltage) is applied to a third wire and a fourth wire of the quadrupole electric field channel, in a second electric field configuration, a positive voltage is applied to the third wire of the quadrupole electric field channel, a negative voltage is applied to the fourth wire of the quadrupole electric field channel, and substantially no voltage (or DC voltage) is applied to the first wire and second wire of the quadrupole electric field channel, the quadrupole electric field channel is switched between the first electric field configuration and the second electric field configuration at a frequency over a period of time.

4. The apparatus of claim 1, wherein the apparatus includes a plurality of field channels and each quadrupole electric field channel being located in substantially a same plane.

5. The apparatus of claim 1, wherein the first set of wires and the second set of wires of the first dielectric plate and the third set of wires and the fourth set of wires of the second dielectric plate are configured such that an effective sinusoidal wavelength decreases to match shorter distances as polar molecules are decelerated as they traverse the quadrupole electric field channel.

6. The apparatus of claim 1, wherein:

the first set of wires is applied to the first dielectric plate in substantially a first sinusoidal pattern;

the second set of wires is applied to the first dielectric plate in substantially a second sinusoidal pattern;

the third set of wires is applied to the second dielectric plate in substantially a third sinusoidal pattern;

the fourth set of wires is applied to the second dielectric plate in substantially a fourth sinusoidal pattern;

the first sinusoidal pattern is approximately in-phase with the second sinusoidal pattern;

the third sinusoidal pattern is approximately in-phase with the fourth sinusoidal pattern; and the first and second sinusoidal patterns are between 120 degrees and 240 degrees out-of-phase to the third and fourth sinusoidal patterns.

7. The apparatus of claim 6, wherein the first, second, third, and fourth sinusoidal patterns are applied to each have a decreasing wavelength pattern relative to an entry port of the quadrupole electric field channel and an exit port of the quadrupole electric field channel.

8. The apparatus of claim 6, wherein the first, second, third, and fourth sinusoidal patterns are applied to each have substantially constant wavelengths.

9. A method implemented on an apparatus, the apparatus comprising:

a first dielectric plate having a substantially planar shape and the first dielectric plate includes:

a first set of wires being attached onto a surface of the first dielectric plate;

a second set of wires being attached onto the surface of the first dielectric plate, wherein the first set of wires and the second set of wires include a plurality of electrically conductive wires each being located parallel to one another;

a first interconnecting wire for connecting one end of each of the first set of wires; and a second interconnecting wire for connecting one end of each of the second set of wires, wherein:

the first set of wires is interdigitated with the second set of wires; and the first interconnecting wire and the second interconnecting wire are located on opposite edges of the first dielectric plate;

and a second dielectric plate having substantially planar shape matching the first dielectric plate and the second dielectric plate includes:

a third set of wires being attached onto a surface of the second dielectric plate;

a fourth set of wires being attached onto the surface of the second dielectric plate, wherein the third set of wires and the fourth set of wires include a plurality of electrically conductive wires each being located parallel to one another;

a third electrically conductive interconnecting wire for connecting one end of each of the third set of wires; and a fourth electrically conductive interconnecting wire for connecting one end of each of the fourth set of wires, wherein:

the third set of wires is interdigitated with the fourth set of wires;

the third electrically conductive interconnecting wire and the fourth electrically conductive interconnecting wire are located on opposite edges of the second dielectric plate; and the first dielectric plate and the second dielectric plate are spaced apart such that every four wires, two wires from the first dielectric plate and two wires from the second dielectric plate, form a quadrupole electric field channel for guiding neutral polar molecules;

the method comprising:

in a first electric field configuration:

applying a positive voltage to a first wire of the quadrupole electric field channel;

applying a negative voltage to a second wire of the quadrupole electric field channel; and applying substantially no voltage (or a DC voltage) to a third wire and a fourth wire of the quadrupole electric field channel;

in a second electric field configuration:

applying the positive voltage to the third wire of the quadrupole electric field channel;

applying the negative voltage to the fourth wire of the quadrupole electric field channel; and applying substantially no voltage to the first and second wires of the quadrupole electric field channel;

and switching the quadrupole electric field channel between the first electric field configuration and the second electric field configuration at a frequency over a period of time.

10. The method of claim 9 further comprising switching the quadrupole electric field channel between the first electric field configuration and the second electric field configuration in a sinusoidal manner.

11. The method of claim 9 further comprising passing one or more neutral polar molecules between the first dielectric plate and the second dielectric plate in a direction of the quadrupole electric field channel.

12. The method of claim 11, further comprising decelerating the neutral polar molecules as they traverse lengths of the quadrupole electric field channel.

13. The method of claim 11, further comprising discriminating the polar molecules based on their mass-to-dipole moment ratios.

14. The method of claim 13, wherein discriminating the polar molecules based on their mass-to-dipole moment ratios includes only passing molecules through a gap between the first dielectric plate and the second dielectric plate within a range of mass-to-dipole moment ratios.

15. An apparatus comprising:
a first dielectric plate that includes:
a first set of wires being attached onto a surface of the first dielectric plate;
a second set of wires being attached onto the surface of the first dielectric plate;
a third set of wires being attached onto the surface of the first dielectric plate;
a fourth set of wires being attached onto the surface of the first dielectric plate, wherein the first set of wires, the second set of wires, the third set of wires, and the fourth set of wires each include a plurality of electrically conductive wires each being located parallel to one another;
a first interconnecting wire for connecting one end of each of the first set of wires; and
a second interconnecting wire for connecting one end of each of the second set of wires;
a third interconnecting wire for connecting one end of each of the third set of wires; and
a fourth interconnecting wire for connecting one end of each of the fourth set of wires, wherein:
the first set of wires, the second set of wires, the third set of wires, and the fourth set of wires are interdigitated;
the first interconnecting wire and the second interconnecting wire are located on opposite edges of the first dielectric plate; and
the third interconnecting wire and the fourth interconnecting wire are located on opposite edges of the first dielectric plate;
and
a second dielectric plate having a substantially planar shape and the second dielectric plate includes:
a fifth set of wires being attached onto a surface of the second dielectric plate;
a sixth set of wires being attached onto the surface of the second dielectric plate, wherein the fifth set of wires and the sixth set of wires include a plurality of electrically conductive wires each being located parallel to one another;
a fifth electrically conductive interconnecting wire for connecting one end of each of the fifth set of wires; and
a sixth electrically conductive interconnecting wire for connecting one end of each of the sixth set of wires, wherein:
the fifth set of wires is interdigitated with the sixth set of wires;
the fifth electrically conductive interconnecting wire and the sixth electrically conductive interconnecting wire are located on opposite edges of the second dielectric plate; and
the first dielectric plate and the second dielectric plate are spaced apart such that every six wires, four wires from the first dielectric plate and two wires from the second dielectric plate, form a hexapole electric field channel for guiding neutral polar molecules.

16. An apparatus comprising:
a first dielectric plate that includes:
a first set of wires being attached onto a surface of the first dielectric plate;
a second set of wires being attached onto the surface of the first dielectric plate;
a third set of wires being attached onto the surface of the first dielectric plate;
a fourth set of wires being attached onto the surface of the first dielectric plate, wherein the first set of wires, the second set of wires, the third set of wires, and the fourth set of wires each include a plurality of electrically conductive wires each being located parallel to one another;
a first interconnecting wire for connecting one end of each of the first set of wires; and
a second interconnecting wire for connecting one end of each of the second set of wires; and
a third interconnecting wire for connecting one end of each of the third set of wires; and
a fourth interconnecting wire for connecting one end of each of the fourth set of wires, wherein:
the first set of wires, the second set of wires, the third set of wires, and the fourth set of wires are interdigitated;
the first interconnecting wire and the second interconnecting wire are located on opposite edges of the first dielectric plate; and
the third interconnecting wire and the fourth interconnecting wire are located on opposite edges of the first dielectric plate;
and
a second dielectric plate having a shape substantially matching the first dielectric plate and the second dielectric plate includes:
a fifth set of wires being attached onto a surface of the second dielectric plate;
a sixth set of wires being attached onto the surface of the second dielectric plate;
a seventh set of wires being attached onto the surface of the second dielectric plate;
an eighth set of wires being attached onto the surface of the second dielectric plate, wherein the fifth set of wires, the sixth set of wires, the seventh set of wires, and the eighth set of wires include a plurality of electrically conductive wires each being located parallel to one another;
a fifth electrically conductive interconnecting wire for connecting one end of each of the fifth set of wires;
a sixth electrically conductive interconnecting wire for connecting one end of each of the sixth set of wires;
a seventh electrically conductive interconnecting wire for connecting one end of each of the seventh set of wires; and
an eighth electrically conductive interconnecting wire for connecting one end of each of the eighth set of wires, wherein:
the fifth set of wires, the sixth set of wires, the seventh set of wires, and the eighth set of wires are interdigitated;
the fifth electrically conductive interconnecting wire and the sixth electrically conductive interconnecting wire are located on opposite edges of the second dielectric plate;

the seventh electrically conductive interconnecting wire and the eighth electrically conductive interconnecting wire are located on opposite edges of the second dielectric plate; and the first dielectric plate and the second dielectric plate are spaced apart such that every eight wires, four wires from the first dielectric plate and four wires from the second dielectric plate, form an octupole electric field channel for guiding neutral polar molecules.

* * * * *